United States Patent [19]

Makkonen

[11] Patent Number: 4,773,760

[45] Date of Patent: Sep. 27, 1988

[54] PROCEDURE AND MEANS FOR MEASURING THE THICKNESS OF A FILM-LIKE OR SHEET-LIKE WEB

[76] Inventor: Tapio Makkonen, Ouritie 4, SF-02780, Espoo, Finland

[21] Appl. No.: 909,980

[22] Filed: Sep. 22, 1986

[30] Foreign Application Priority Data

May 14, 1986 [FI] Finland ............................ 862006

[51] Int. Cl.⁴ ............................................ G01B 11/06
[52] U.S. Cl. ................................... 356/381; 356/382
[58] Field of Search ................ 356/381, 382, 384–387

[56] References Cited

U.S. PATENT DOCUMENTS

| | | | |
|---|---|---|---|
| 3,565,531 | 2/1971 | Kane et al. | 356/394 |
| 3,732,016 | 5/1973 | Deshayes et al. | 356/382 |
| 4,276,480 | 6/1981 | Watson | 356/381 |
| 4,298,286 | 11/1981 | Maxey et al. | 356/381 |
| 4,358,960 | 11/1982 | Porter | 356/375 |

FOREIGN PATENT DOCUMENTS 0104806  6/1982  Japan .................................. 356/381

*Primary Examiner*—R. A. Rosenberger
*Assistant Examiner*—Crystal Cooper
*Attorney, Agent, or Firm*—Handal & Morofsky

[57] ABSTRACT

The invention concerns a procedure for measuring the thickness of a film-like or sheet-like web. In the procedure, measuring heads located on both sides of the web and detectors provided in these are employed to measure the distances of the measuring heads from the respective surface of the web. Moreover, the distance from each other of the measuring heads is measured and from the three results of measurement thus obtained, the thickness of the web is calculated. The invention furthermore concerns a measuring means for implementing the procedure, this means comprising measuring heads located on both sides of the web, at a distance from the web, these measuring heads being provided with detectors for measuring the distance of each measuring head from the web surface on the respective side and with a detector for measuring the distance between the measuring heads.

18 Claims, 2 Drawing Sheets

PROCEDURE AND MEANS FOR MEASURING THE THICKNESS OF A FILM-LIKE OR SHEET-LIKE WEB

BACKGROUND OF THE INVENTION

The present invention concerns a procedure as defined in tthe introductory part of claim 1, and a means as defined in the introductory part of claim 6, for measuring the thickness of a film-like or sheet-like web.

The general principle of operation of web thickness meters on paper machines is that the web is in contact by one surface with a stationary part of a detector and by its other surface with a movable part which moves in conformity with the web thickness and measures, e.g. inductively, the distance of the moving part from the stationary part. If the detectors contact the web under measurement uniformly all the time on both sides, correct measurement of thickness is achieved. For this reason the movable part has been made light so that it might be able to move fast and so that it might not damage the web. As a result of such light weight, the flutter of the web is able to sway the movable part so that the web fails to touch the detector on both of its surfaces, and hereby an incorrect result of measurement will be obtained. Another drawback is that in any case the movable part has a certain mass and the inertia of this mass has the consequence that it cannot rapidly follow fast variations of the web thickness, nor the web flutter, and this results in incorrect measurements.

In thickness detectors employed in the art, modifications of the above principle are applied, but the fundamental principle is still that the web passes through between two bodies, the distance between these being measured and this distance being assumed to be proportional to the web thickness, while web fluttering, among other things, causes erroneous results of measurement.

Another state of art in measuring web thickness is described in the U.S. Pat. Nos. 3,536,405, 4,068,955 and 3,671,726, in which web thickness measurement is accomplished without web contact. These procedures are not usable in the case of wide webs because detectors supported by elongated supporting structures on either side of the web would be subject to vibration induced by the running of the machine, whereby the result of measurement is not accurate, particularly owing to the circumstance that the thickness which should be measured are on the order of a few micrometers, or at most a few millimeters, for which reason even minor vibration introduces a high relative error.

SUMMARY OF THE INVENTION

The object of the present invention is to eliminate the drawback mentioned. A particular object of the invention is to provide a procedure and a means for measuring web thickness in which the external inaccuracy of measurement arising from the motion of the web and from the machine putting the web in motion as well as that due to non-uniformity of the web can be eliminated. Furthermore, the invention aims to provide a procedure and means in the case of which the correct placement and calibration of the detectors that are used is not as critical as in existing procedures and means because the detectors themselves measure and take into account any minor errors incurred in their placement and mounting.

Reference is made to the claims section regarding the characteristic features of the invention.

The measuring procedure of the invention is characterized in that on both sides of the web which one desires to measure have been placed measuring heads, their distance from each other being measured at the same time as the distance of each measuring head from the web between them is being measured whereby from these three measured quantities the web thickness can be found by calculation, either analog or digital.

The measuring means of the invention is characterized in that the means comprises measuring heads to be mounted on both sides of the web, these measuring heads comprising at least one detector for measuring the distance between said measuring heads. Moreover, each measuring head comprises detectors for measuring the distance of the web surface on the respective side from the measuring head.

With the measuring procedure and means of the invention, web thickness can be measured substantially continuously, or periodically, as may be required in each instance. The essential thing is that at all times simultaneous measurements are made of the distances of the measuring heads from the respective web surfaces and of the spacing of said measuring heads.

The advantage, compared with prior art, of the measuring procedure and means of the invention is that the vibration and shocks induced by environment, by the running of the machine or by web uniformity exert no influence on the result of measurement and that, instead by simultaneously using three different detectors as taught by the invention those disturbing effects are successfully eliminated which are encountered in measurements performed with prior art means.

BRIEF DESCRIPTION OF THE DRAWINGS

In the following, the invention is described in detail with reference to the attached drawing, wherein.

DETAILED DESCRIPTION OF THE DRAWINGS

Figure 1:
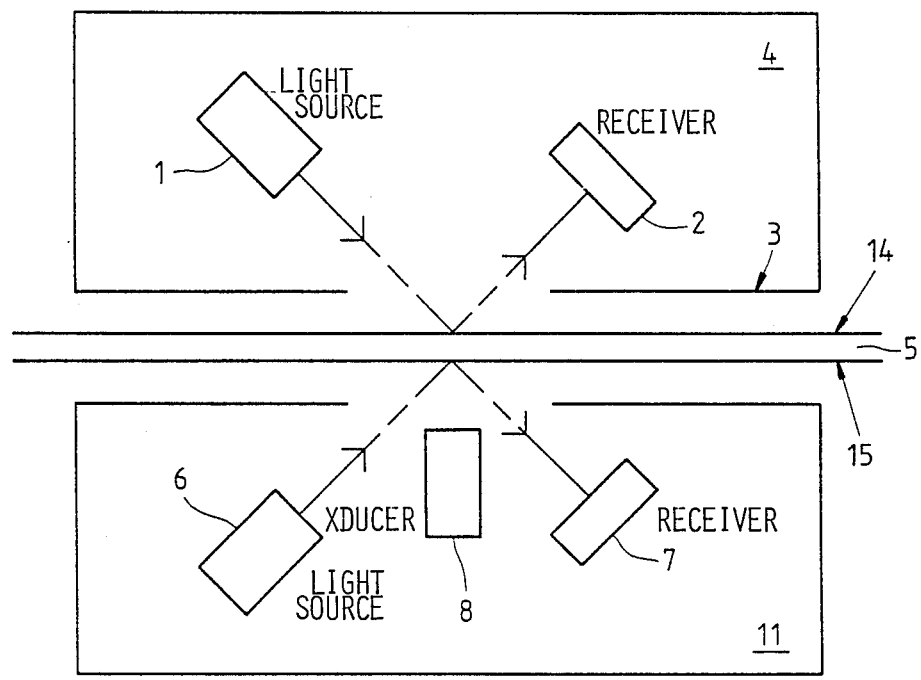
FIG. 1 presents an embodiment of the invention.
Figure 2:
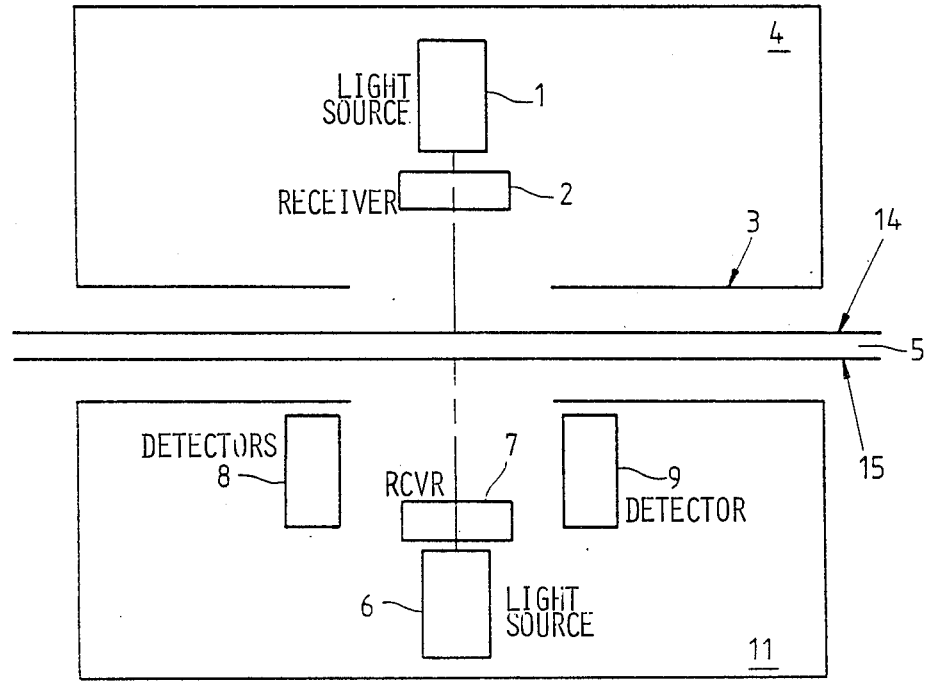
FIG. 2 shows the embodiment of FIG. 1, viewed in another direction.

One measuring apparatus according to the invention, depicted in FIGS. 1 and 2, comprises two closely adjacent measuring heads 4 and 11. Between these measuring heads is interposed the web 5 that has to be measured, without contact with the measuring heads. The measuring head 4 contains a light source 1 emitting a narrow light beam. The light beam coming from this source impinges on the top surface 14 of the web 5 thereinunder, and this illuminated point is reproduced as an image on the position-sensing surface of a receiver 2. The position of the image of the illuminated point on the position-sensing surface of the receiver will change if the distance of the top web surface from the measuring head 4 changes. In other words, from the receiver 2 a signal U1 is obtained, its magnitude proportional to the distance of the measuring head 4 from the top surface 14 of the web.

There is similarly, under the web 5, a measuring head 11 with a light source 6 emitting a light beam, and a receiver 7, this receiver producing a signal U2 of which the magnitude is proportional to the distance of the measuring head 11 from the underside 15 of the web 5.

The measuring head 11 contains an inductive detector, or transducer 8, which senses the underside 3 of the measuring head 4, furnishing a signal U3 which is proportional to the distance between the measuring heads 4 and 11, adjacent to the inductive transducer 8. From the signal U3 is obtained the true distance L3 between the measuring heads 4 and 11, and similarly the signal U1 yields the true distance L1 of the measuring head 4 from the topside surface 14 of the paper, and the signal U2 yields the true distance L2 of the measuring head 11 from the underside surface 15 of the paper. Thus one obtains the thickness of the paper: $T = L3 - L1 - L2$.

Since, however, it is difficult with an inductive transducer to measure the distance between the measuring heads exactly at the same spot where the beams of the optical detectors meet the web, the inductive transducer is positioned outside the imaginary plane connecting the optical detectors. As can be seen in FIG. 2, in the case that the measuring heads 4 and 11 are not constantly in a given fixed position relative to each other, the distance between these measuring heads will be measured with two detectors 8 and 9, whereby it becomes possible to determine the potential change of the relative positioning of the measuring heads and, at the same time, to find the true distance from each other of the measuring heads at the point of measurement of the optical detectors.

Figure 3:
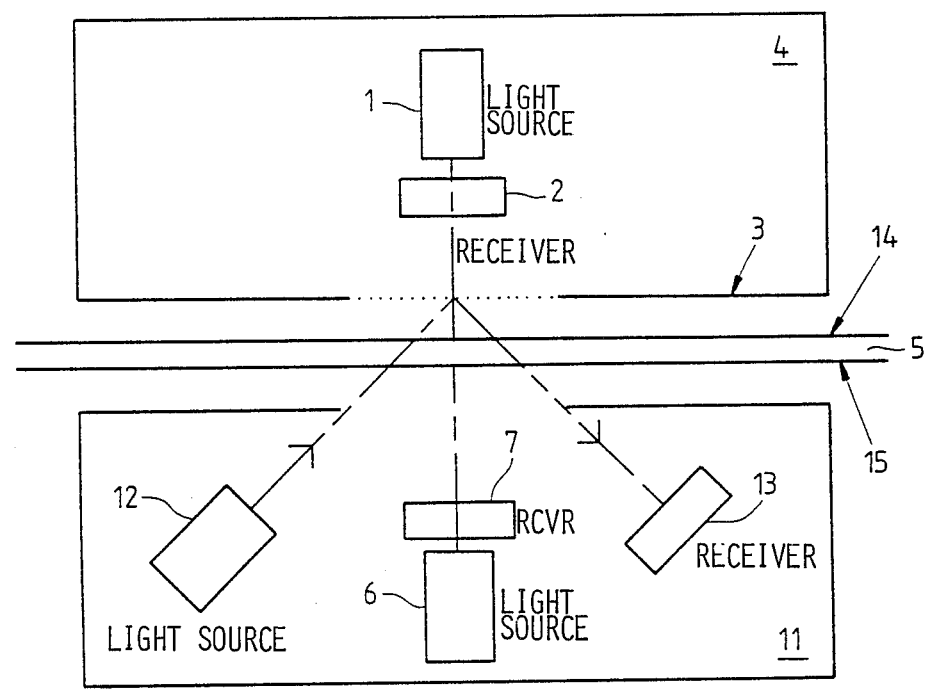
FIG. 3 presents another embodiment of the invention.

In FIG. 3 is depicted another embodiment of the invention, wherein the distance between the measuring heads 4 and 11 is measured with an optical detector. In the measuring head 11 has been placed a light source 12 emitting a narrow light beam, this light source emitting light with such wavelength that it penetrates through the paper to hit the surface 3 of the measuring head 4, and an image of this light spot is formed on the position-sensing surface of the receiver 13. In this case IR radiation, for instance, may be contemplated. From the receiver 13 is then obtained a signal of which the magnitude is proportional to the distance between the measuring heads.

By suitably selecting the angles of incidence and departure of the optical detectors' light beams, all distances can be determined on one straight line perpendicular against the web, and therefore only one optical detector is needed in measuring the distance between the measuring heads 4 and 11 even if the position of the measuring heads relative to each other should be somewhat variable.

It is obvious to a person skilled in the art that different embodiments of the invention are not confined merely to the examples that have been presented and that they may rather vary within the scope of the inventive idea delimited by the claims. For instance, towards measuring the distance between the measuring heads and the distance between measuring head and web also other methods and other kinds of apparatus may be used than those presented in the foregoing.

What is claimed is:

1. A method for measuring the thickness of a film-like or sheet-like web using measuring heads located on both sides of said web, comprising the steps of measuring the distance of each of the measuring heads from its respective surface of said web to generate first and second parameters, simultaneously measuring the distance between said measuring heads, said distance between the heads being measured through the web to generate a third parameter, and calculating the thickness of the web from said first parameter, said second parameter and said third parameter.

2. A method for measuring the thickness of a film-like or sheet-like web using measuring heads located on opposite sides of said web and each in facing spaced relationship to its respective side of said web, comprising the steps of measuring the distance of each of the measuring heads from its respective surface of said web to generate first and second parameters, simultaneously measuring the distance between said measuring heads, said distance between the heads being measured through the web to generate a third parameter, and calculating the thickness of the web from said first parameter, said second parameter and said third parameter.

3. The method according to claim 2 wherein the distance between said measuring heads is measured optically, using light having a wavelength which penetrates through said web interposed between the measuring heads.

4. The method according to claim 2 wherein the distance between said measuring heads is measured using an inductive measuring instrument.

5. The method according to claim 2 wherein the distances of the surfaces of the web from their respective measuring heads are measured at a point on the web located on a line perpendicular to the web along which the distance between the measuring heads is measured.

6. The method according to claim 2 wherein the distance between the measuring heads is measured with two detectors and between these, at the central point between the detectors are measured the distance of a surface of the web from the respective measuring head.

7. A measuring apparatus for measuring thickness of a film-like or sheet-like web comprising first and second measuring heads positioned on opposite sides of the web at a distance from the web, each of said measuring heads containing a detector means for measuring the distance of each measuring head from the surface of the web on its respective side of the web, said first measuring head generating a first signal, and said second measuring head generating a second signal; separation detector means for simultaneously measuring through the web the distance of the measuring heads from each other to generate a third signal; and means to calculate the thickness of said web from said first, second and third signals.

8. Apparatus according to claim 7, wherein said separation detector means comprises at least two separation detector elements for measuring the distance between the measuring heads.

9. Apparatus according to claim 7, wherein at least one of the two measuring heads comprises at least two detector elements for measuring the distance between the measuring heads and the web surface on its respective side.

10. Apparatus according to claim 7 wherein said separation detector means is an optical detector which measures the distance between the measuring heads with light having a wavelength which penetrates through the web interposed between the measuring heads.

11. Apparatus according to claim 8, wherein said separation detector means is an optical detector which measures the distance between the measuring heads with light having a wavelength which penetrates through the web interposed between the measuring heads.

12. Apparatus according to claim 9 wherein said separation detector means is an optical detector which measures the distance between the measuring heads with light having a wavelength which penetrates through the web interposed between the measuring heads.

13. Apparatus according to claim 7 wherein the separation detector means comprises an inductive measuring detector means for measuring the distance between the measuring heads.

14. Apparatus according to claim 7 wherein the measuring heads and the separation detector means for measuring the distance between the measuring heads are positioned so that the points of measurement in the respective measurements are located on one straight line perpendicular to the web under measurement.

15. Apparatus according to claim 7, wherein said separation detector means comprises at least two separation detector elements at sides of each head opposite a point of measurement of the distance of said head from said web.

16. Apparatus according to claim 8, wherein said separation detector means comprises at least two separation detector elements at sides of each head opposite a point of measurement of the distance of said head from said web.

17. Apparatus according to claim 10, wherein said separation detector means comprises at least two separation detector elements at sides of each head opposite a point of measurement of the distance of said head from said web.

18. Apparatus as in claim 17, wherein said point of measurement is approximately centered between said two separation detector elements.

* * * * *